(12) United States Patent
Xu et al.

(10) Patent No.: US 10,567,558 B2
(45) Date of Patent: Feb. 18, 2020

(54) CAMERA EXTENDING AND RETRACTING DEVICE AND MOBILE PHONE

(71) Applicant: SHENZHEN ZHAOWEI MACHINERY & ELECTRONICS CO., LTD., Shenzhen, Guangdong (CN)

(72) Inventors: Shangxiang Xu, Guangdong (CN); Weiqun Xie, Guangdong (CN); Xiaoyun Yang, Guangdong (CN)

(73) Assignee: Shenzhen Zhaowei Machinery & Electronics Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 16/170,537

(22) Filed: Oct. 25, 2018

(65) Prior Publication Data

US 2019/0173986 A1 Jun. 6, 2019

Related U.S. Application Data

(63) Continuation of application No. PCT/CN2018/080226, filed on Mar. 23, 2018.

(30) Foreign Application Priority Data

Dec. 6, 2017 (CN) .......................... 2017 1 1274758

(51) Int. Cl.
*F16C 19/50* (2006.01)
*H04M 1/02* (2006.01)

(52) U.S. Cl.
CPC ....... *H04M 1/0208* (2013.01); *H04M 1/0249* (2013.01); *H04M 1/0264* (2013.01); *H04M 1/0235* (2013.01)

(58) Field of Classification Search
CPC ........ H04M 1/0208; F16H 25/24; F16C 19/50
See application file for complete search history.

(56) References Cited

U.S. PATENT DOCUMENTS

4,579,396 A * 4/1986 Moser ..................... F16C 19/50
384/49

FOREIGN PATENT DOCUMENTS

| CN | 202858231 | * | 4/2013 | ............. A47B 11/00 |
| CN | 103244629 | * | 8/2013 | ............. F16H 25/24 |
| CN | 203984539 | | 12/2014 | |

(Continued)

OTHER PUBLICATIONS

International Search Report filed in PCT/CN2018/080226 dated Aug. 15, 2018.

*Primary Examiner* — Myron Wyche
(74) *Attorney, Agent, or Firm* — Rankin, Hill & Clark LLP (57) ABSTRACT

A camera extending and retracting device, including: a support base configured to be mounted inside a housing of a mobile phone; a screw movably arranged on the support base; a drive unit in connection with one end of the screw; a nut arranged on the screw; a push block mounted on the nut and configured to connect with the camera module of the mobile phone. The other end of the screw is provided with a load bearing mechanism configured to bear an axial force of the screw, and the load bearing mechanism is mounted on the support base. A mobile phone, includes: a housing, a camera module arranged in the housing, and a display screen arranged on the housing, and the above camera extending and retracting device.

12 Claims, 5 Drawing Sheets

(56) References Cited

FOREIGN PATENT DOCUMENTS

| CN | 205725913 |   | 11/2016 |   |          |
|----|-----------|---|---------|---|----------|
| CN | 106790833 |   | 5/2017  |   |          |
| CN | 106856516 |   | 6/2017  |   |          |
| CN | 107197133 | * | 9/2017  | … | H04N 5/225 |
| CN | 207251786 |   | 4/2018  |   |          |
| CN | 207530914 |   | 6/2018  |   |          |
| CN | 207530918 |   | 6/2018  |   |          |

* cited by examiner

CAMERA EXTENDING AND RETRACTING DEVICE AND MOBILE PHONE

CROSS-REFERENCE TO RELATED APPLICATIONS

This application is a continuation of International Patent Application No. PCT/CN2018/080226 with an international filing date of Mar. 23, 2018, designating the United States, now pending, and further claims priority benefits to Chinese Patent Application No. 201711274758.4 filed on Dec. 6, 2017. The contents of all of the aforementioned applications, including any intervening amendments thereto, are incorporated herein by reference.

TECHNICAL FIELD

The present application relates to the technical field of mechanical transmission, and more particularly to a camera extending and retracting device and a mobile phone.

BACKGROUND

With the improvement in the design and the manufacturing techniques of the smart mobile phone, smart mobile phones with high display proportion has quickly become dominant in the market and a vital developing direction in recent years. The camera of the smart mobile phone has not been capable of penetrating through a display for photographing yet, that is, the camera should be designed at a region out of the display screen, moreover, the improvement of the display screen proportion means further decrease in the space on the periphery of the mobile phone for installing the camera, therefore, for a mobile phone with high display proportion, the camera should be hidden at a back side of the display screen, and the camera retracts when not to be used and extends out of the display screen for photographing when to be used.

In the prior art, the screw-and-nut transmission type is commonly adopted to drive the extending and retracting movement of the camera, however, because of the small dimensions and therefore the relatively weak strength of the components, the screw tends to be stuck, which would affect the transmission efficiency, or tends to be loosen, which would result in failure.

Technical Problems

It is an objective of the present application to provide a camera extending and retracting device so as to tackle the technical problem that the screw-and-nut type transmission components of the mobile phone in the prior art has low transmission efficiency and the transmission thereof tends to fail due to their small dimensions and weak strengths.

Technical Solutions

The present application provides a camera extending and retracting device. The camera extending and retracting device comprises: a support base configured to be mounted inside a housing of a mobile phone; a screw movably arranged on the support base; a drive unit in connection with one end of the screw; a nut arranged on the screw; and a push block mounted on the nut and configured to connect with the camera module of the mobile phone. The other end of the screw is provided with a load bearing mechanism configured to bear an axial force of the screw, and the load bearing mechanism is mounted on the support base.

Further, the support base comprises: a base plate configured to be mounted inside the housing, and a first mounting plate and a second mounting plate respectively arranged at both ends of the base plate. One end of the screw passes through the first mounting plate and is in connection with the drive unit, and the other end of the screw is arranged at the second mounting plate via the load bearing mechanism.

Further, the load bearing mechanism comprises: a bearing washer, two seat rings, two holders, and balls. The bearing washer is arranged between the two seat rings, each of the two holders is arranged between each of the two seat rings and the bearing washer, and the balls are embedded in the two holders. The other end of the screw is provided with a bare axel section, and the bearing washer, the two seat rings, and the two holders are all sleeved onto the bare axel section. An outer periphery of the bearing washer is fixed on the second mounting plate, and the two seat rings are respectively axially stopped at two ends of the bare axel section.

Further, the second mounting plate defines a two-stage stepped hole thereon; and the bearing washer is hold in a relatively large hole in the two-stage stepped hole and is stopped by a step of the two-stage stepped hole.

Further, each said holder defines ball accommodating grooves thereon; balls are accommodated in the ball accommodating grooves and extend out of two opposite sides of each said holder, where both the bearing washer and the seat rings define countersunk grooves therein at positions corresponding to the balls to accommodate extending portions of the balls.

Further, the load bearing mechanism is a bidirectional thrust ball bearing.

Further, a guide rod is further arranged between the first mounting plate and the second mounting plate, the guide rod is in parallel with the screw and configured to guide the nut to move.

Further, the drive unit comprises: an electric motor configured to be in electric connection with a control circuit of the mobile phone, and a reducer in transmission connection between the electric motor and the screw.

Further, the reducer is a planetary reducer.

The present application further provides a mobile phone, comprising: a housing, a camera module arranged in the housing, and a display screen arranged on the housing, wherein the mobile phone further comprises the above-described camera extending and retracting device. The camera extending and retracting device is in operative connection with the camera module and is configured to drive the camera module to extend out of the display screen and to retract to a back side of the display screen.

Beneficial Effects

In the camera extending and retracting device provided by the present application, when compared with the prior art, by arranging the load bearing mechanism 5 at the other end of the screw 2, the load bearing mechanism 5 is capable of bearing the axial force of the screw 2, such that the bearing strength of the screw 2 is improved, the transmission mechanism of the screw 2 and the nut 3 does not tend to be damaged or stuck even in case of relatively large load, which would otherwise affect the transmission efficiency or result in failure due to loosening, thus ensuring more stable and reliable transmission of the camera extending and retracting device. Moreover, in the mobile phone of the present application, by adopting the camera extending and retracting device as described above, the camera module of the mobile phone can be installed on the back side of the display screen, thereby improving the display screen proportion of the mobile phone.

DESCRIPTION OF THE DRAWINGS

In order to more clearly illustrate the technical solutions in embodiments of the present application, the drawings to be used in descriptions of the embodiments or the prior art will be briefly described hereinbelow. Obviously, the drawings in the following description are merely some embodiments of the present application, other drawings may also be obtained by persons having ordinary skills in the art without paying creative labors in accordance with these drawings.

In the drawings, the following reference numerals are utilized:

1. Support base; 2. Screw; 3. Nut; 4. Push block; 5. Load bearing mechanism; 6. Guide rod; 7. Electric motor; 8. Reducer; 11. Base plate; 12. First mounting plate; 13. Second mounting plate; 14. Reinforcing plate; 15. Screw plate; 21. Bare axel section; 22. Threaded section; 31. First threaded hole; 32. Guide hole; 51. Bearing washer; 52. Seat ring; 53. Holder; 54. Ball; 81. Male thread; 120. Second threaded hole; 130. Two-stage stepped hole; 210. Counterbore; 510. Countersunk groove; 530. Ball accommodating groove; 1301. Large bore hole; 1302. Small bore hole; and 1303. Step.

EMBODIMENTS OF THE PRESENT APPLICATION

In order to make the technical problems to be solved, technical solutions, and beneficial effects of the present application much clearer, the present application will be further described in detail hereinbelow with reference to the accompanying drawings and embodiments. It should be understood that the specific embodiments described herein are merely illustrative and are not intended to limit the present application.

It is should be noted that when an element is referred to as being "fixed" or "arranged" at/on/in, etc. another element, it can be directly or indirectly at/on/in the other element. When an element is referred to as being "connected" to another element, it can be directly or indirectly connected to the other element.

It should be understood that terms, such as "length", "width", "upper", "lower", "front", "back", "left", "right", "vertical", "horizontal", "top", "bottom", "inside", "outside", and the like, indicating the orientation or positional relationship are based on the orientation or positional relationship shown in the drawings, and are merely for facilitating the description of the present application and simplifying the description, rather than indicating or implying that the device or component referred to must have a particular orientation, or be constructed and operated in a particular orientation, and thus should not to be construed as limitation of the application.

In addition, the terms "first" and "second" are used for descriptive purposes only, and are not to be construed as indicating or implying a relative importance or implicitly indicating the number of the technical features indicated. Thus, features defining "first" and "second" may include one or more of the features either explicitly or implicitly. In the description of the present application, the meaning of "a plurality" is two or more unless otherwise specifically defined.

Figure 1:
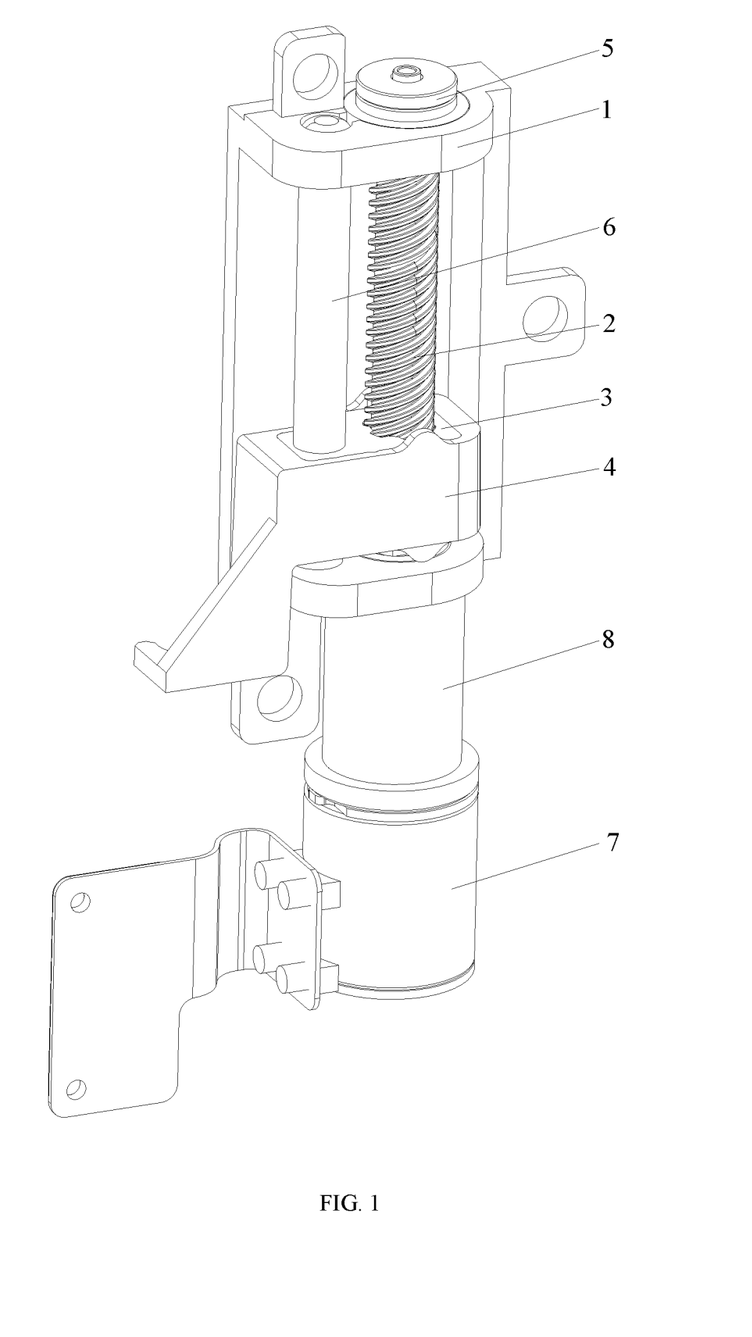
FIG. 1 is a perspective schematic view of a camera extending and retracting device provided by an embodiment of the present application.
Figure 2:
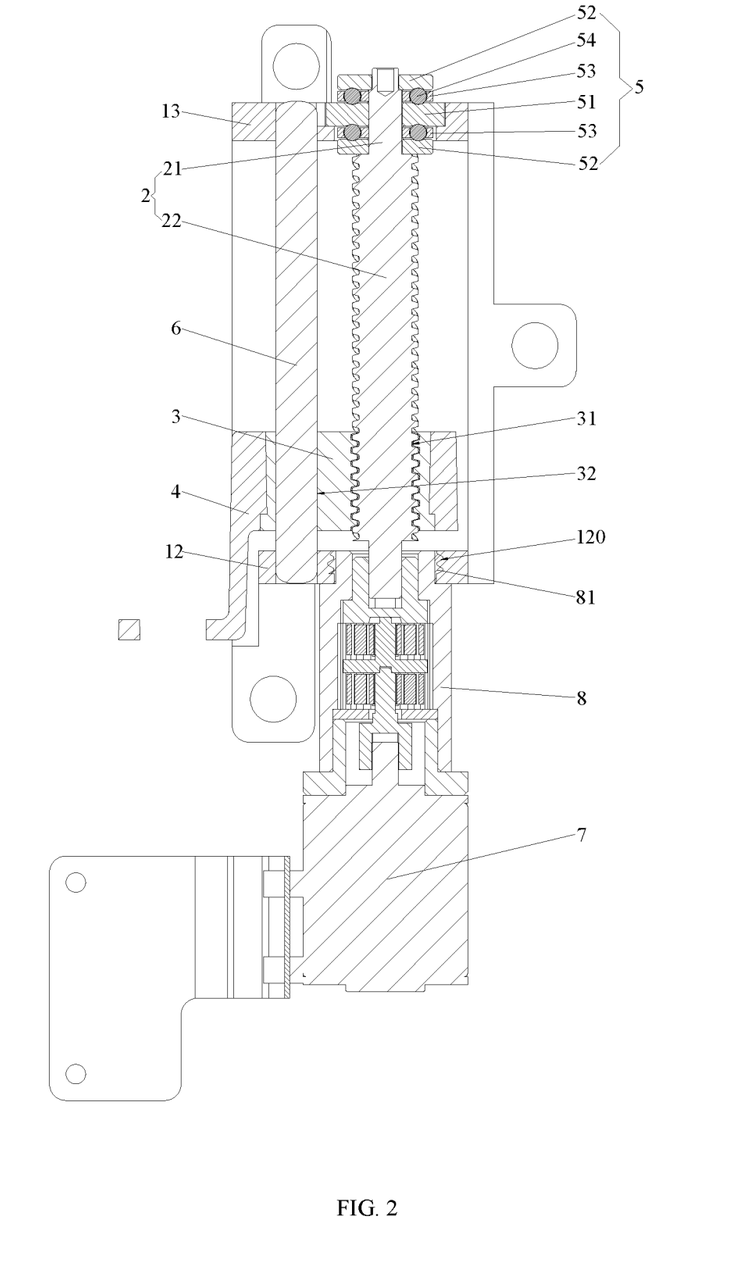
FIG. 2 is a sectional schematic view of a camera extending and retracting device provided by an embodiment of the present application.

As shown in FIGS. 1-2, a camera extending and retracting device provided by the present application is described as follows. The camera extending and retracting device is installed within a housing of a mobile phone, when it is needed to take a photo, a camera module inside the mobile phone is pushed out of a display screen by the camera extending and retracting device for photographing; and when the photographing is not needed, the camera module is retracted to a back side of the display screen by the camera extending and retracting device, thus achieving the purpose of high display proportion of the mobile phone. Specifically, the camera extending and retracting device comprises: a support base 1, a drive unit, a screw 2, a nut 3, a push block 4, and a load bearing mechanism 5. The support base 1 is configured to be mounted inside the housing of the mobile phone such that the whole camera extending and retracting device is fixed on the mobile phone. The screw 2 is movably arranged on the support base 1, two ends of the screw 2 are respectively located at two ends of the support base 1 and the screw is rotatable on the support base 1. The drive unit is mounted on the mobile phone and in connection with one end of the screw 2, and the drive unit is configured to drive the screw 2 to rotate. The nut 3 is arranged on the screw 2 and is movable on the screw 2 under the drive of the screw 2. The push block 4 is mounted on the nut 3 and movable along the nut 3. The push block 4 is configured to connect with the camera module so as to push the camera module of the mobile phone to extend out of the display screen or retract to the back side of the display screen. The load bearing mechanism 5 is arranged at the other end of the screw 2, the load bearing mechanism 5 is configured to bear an axial force of the screw 2, and the load bearing mechanism 5 is mounted on the support base 1.

In the camera extending and retracting device provided by the present application, when compared with the prior art, by arranging the load bearing mechanism 5 at the other end of the screw 2, the load bearing mechanism 5 is capable of bearing the axial force of the screw 2, such that the bearing strength of the screw 2 is improved, the transmission mechanism of the screw 2 and the nut 3 does not tend to be damaged or stuck even in case of relatively large load, which would otherwise affect the transmission efficiency or result in failure due to loosening, thus ensuring more stable and reliable transmission of the camera extending and retracting device.

Figure 4:
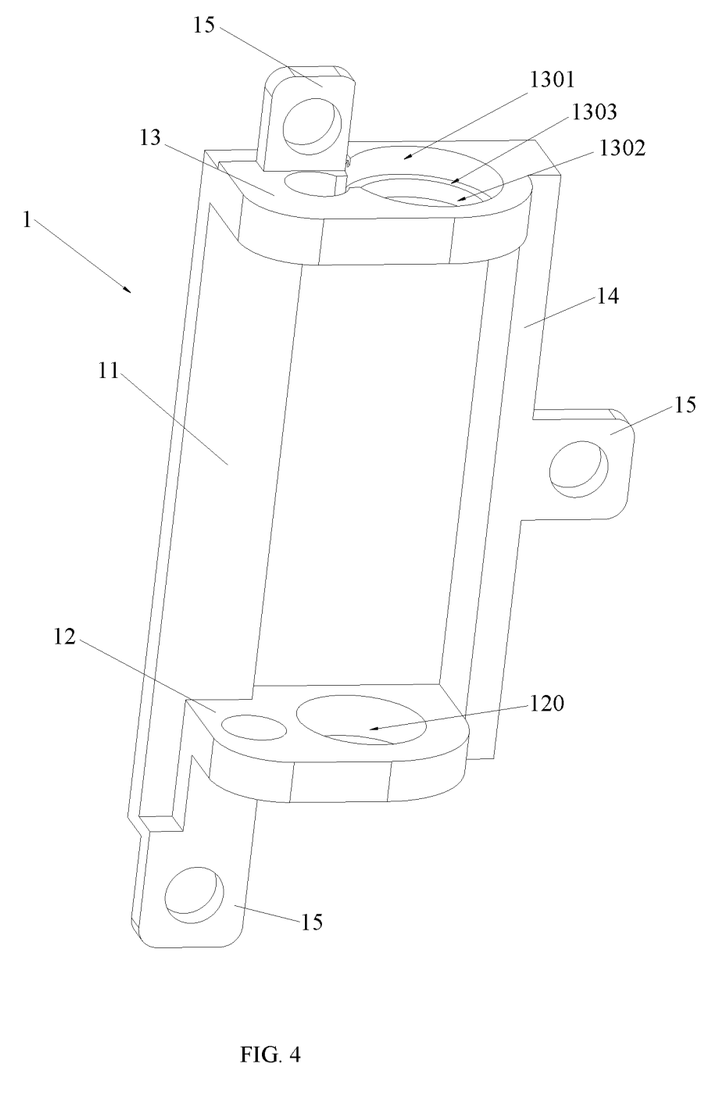
FIG. 4 is a structural schematic view of a support base of FIG. 1.

Further, referring to FIG. 4, as a specific embodiment of the camera extending and retracting device provided by the present application, the support base 1 comprises: a base plate 11, a first mounting plate 12, and a second mounting plate 13. The base plate 11 is configured to be mounted inside the housing, the base plate 11 extends along a vertical direction, and a back side of the base plate 11 is provided with positioning columns configured to position the base plate 11 on the mobile phone. The first mounting plate 12 and the second mounting plate 13 are perpendicularly arranged at two ends of the base plate 11 respectively. One end of the screw 2 passes through the first mounting plate 12 and is in connection with the drive unit, and the other end of the screw 2 is arranged at the second mounting plate 13 via the load bearing mechanism 5. In this embodiment of the present application, in order to reduce the weight of the support base 1 and save the production cost, a width of the base plate 11 is designed to be smaller than both a width of the first mounting plate 12 and a width of the second mounting plate 13. Meanwhile, in order to ensure the strength of the support base 1, a reinforcing plate 14 is in connection between the first mounting plate 12 and the second mounting plate 13. The reinforcing plate 14 is arranged perpendicularly to the base plate 11 and spaced apart from the base plate 11. In addition, in order to fix the support base 1 on the mobile phone, side faces of the first mounting plate 12, the second mounting plate 13, and the reinforcing plate 14 extend to form screw plates 15, and all the screw plates 15 are located on the same plane, and the support base 1 is fixed on the mobile phone via the screw plates 15. In this embodiment of the present application, the base plate 11, the reinforcing plate 14, the first mounting plate 12, the second mounting plate 13, and the screw plates 15 are integrated as a whole, and the processing craft of the support base 1 is simple with low production cost. It should be understood that in other embodiments of the present application, according to practical circumstances and specific requirements, the base plate 11, the reinforcing plate 14, the first mounting plate 12, the second mounting plate 13, and the screw plates 15 may also be formed separately, which are not specifically limited herein.

Figure 3:
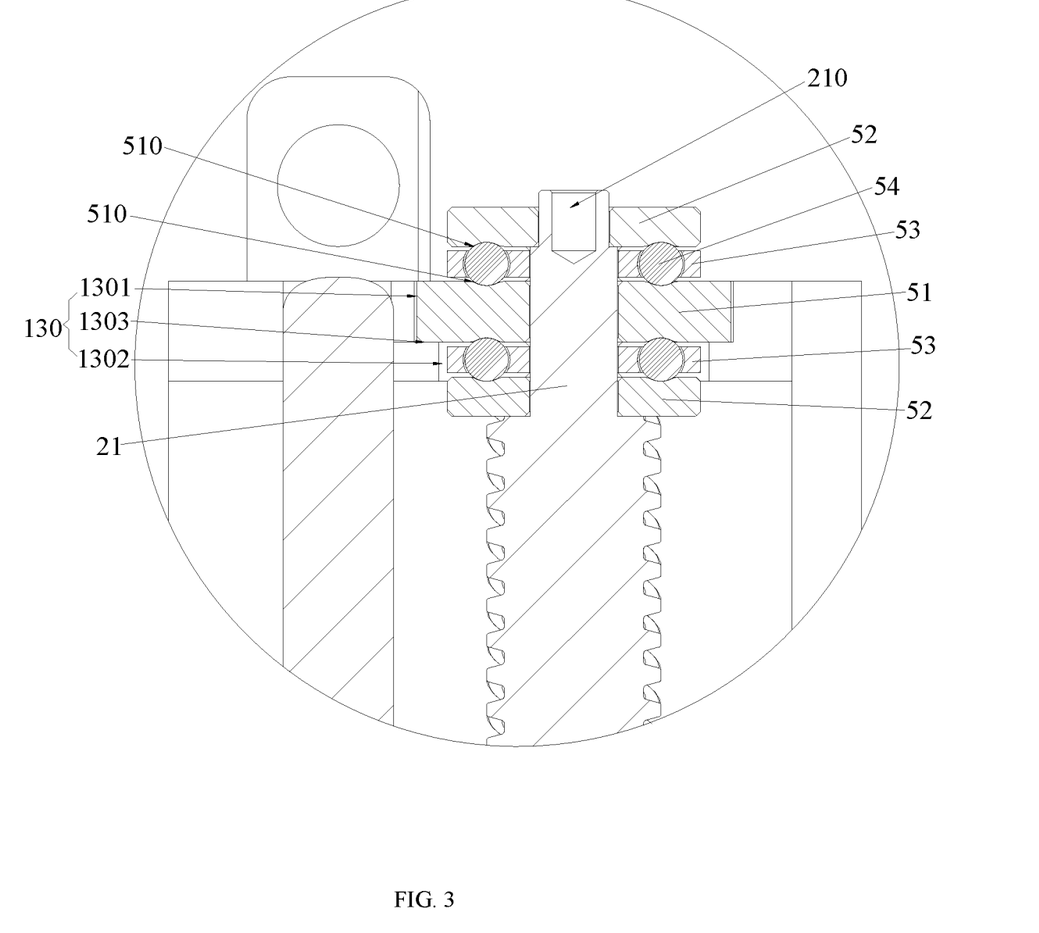
FIG. 3 is a partially enlarged view of FIG. 2.

Preferably, referring to FIG. 3, as a specific embodiment of the camera extending and retracting device provided by the present application, the load bearing mechanism 5 comprises: a bearing washer 51, two seat rings 52, two holders 53, and balls 54. The bearing washer 51 is arranged between the two seat rings 52, each of the two holders 53 is arranged between each of the two seat rings 52 and the bearing washer 51, and the balls 54 are embedded and rotatable in two holders 53. The other end of the screw 2 is provided with a bare axel section 21, and the bare axel section 21 axially passes through the second mounting plate 13, and the bearing washer 51, the two seat rings 52, and the two holders 53 are all sleeved onto the bare axel section 21. The bearing washer 51 is fixed on the second mounting plate 13, and the two seat rings 52 are respectively axially stopped at two ends of the bare axel section 21. The load bearing structure in this embodiment of the present application adopts the design of two seat rings 52 and the two holders 53, such that the load bearing structure is capable of bearing the bidirectional axial force simultaneously, thereby ensuring the strength of the screw 2.

Further, as shown in FIG. 3 and FIG. 4, as a specific embodiment of the camera extending and retracting device provided by the present application, the second mounting plate 13 defines a two-stage stepped hole 130 thereon. The bearing washer 51 is hold in a relatively large hole in the two-stage stepped hole 130 and is stopped by a step 1303 of the two-stage stepped hole 130. Specifically, the two-stage stepped hole 130 comprises: a large bore hole 1301 and a small bore hole 1302. An inner diameter of the large bore hole 1301 is larger than an inner diameter of the small bore hole 1302. The large bore hole 1301 is arranged above the small bore hole 1302, and the step 1303 is arranged between the large bore hole 1301 and the small bore hole 1302. An outer diameter of the bearing washer 51 matches with the inner diameter of the large bore hole 1301, an axial height of the bearing washer 51 is equal to an axial height of the large bore hole 1301, and both the outer diameters of the seat rings 52 and the holder 53 are smaller than the inner diameter of the small bore hole 1302. The bearing washer 51 is accommodated in the large bore hole 1301 and stopped by the step 1303, and the bearing washer 51 is welded into the large bore hole 1301 via laser welding. It should be understood that in other embodiments of the present application, according to practical circumstances and specific requirements, the large bore hole 1301 may also be arranged beneath the small bore hole 1302, in the same way, the bearing washer 51 is still accommodated in the large bore hole 1301 and stopped by the step 1303, which is not specifically limited herein.

In addition, referring to FIG. 3, the screw 2 comprises a threaded section 22 and a bare axel section 21. A diameter of the bare axel section 21 is smaller than a diameter of the threaded section 22, a transitional position between the bare axel section 21 and the threaded section 22 is provided with a thread end face, and a lower end face of the lower seat ring 52 is stopped by the thread end face. A top of the bare axel section 21 is provide with a counterbore 210, a rivet is arranged in the counterbore 210, and a flange of the rivet is fastened onto an upper end face of the upper seat ring 52. In this way, the two seat rings 52 are axially stopped at the two ends of the bare axel section 21, respectively.

Figure 5:
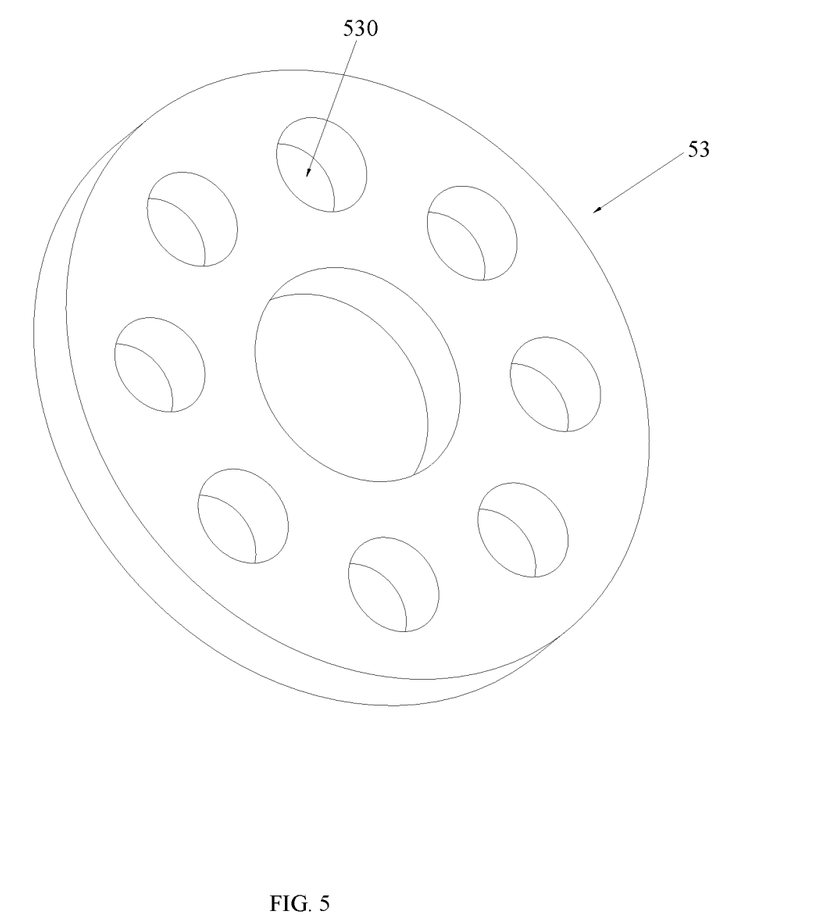
FIG. 5 is a structural schematic view of a holder of FIG. 1.

Further, referring to FIGS. 3 and 5, as a specific embodiment of the camera extending and retracting device provided by the present application, each holder 53 defines ball accommodating grooves 530 thereon. Balls 54 are accommodated in the ball accommodating grooves 530 and extend out of two opposite sides of the holder 53; the bearing washer 51 and the seat rings 52 define countersunk grooves 510 therein at positions corresponding to the balls 54 to accommodate extending portions of the balls 54. The countersunk grooves 510 adopt an annular shape, and a contact face of each countersunk groove 510 contacting with the corresponding ball 54 is a spherical face.

Preferably, as another specific embodiment of the camera extending and retracting device provided by the present application, the load bearing mechanism 5 is preferably a bidirectional thrust ball bearing. The bidirectional thrust ball bearing is capable of bearing the load from two directions, such that no matter the screw 2 is rotated in a clockwise direction or a counterclockwise direction, that is, no matter the screw 2 bears a forward or backward axial thrust, the screw 2 is capable of transmitting the thrust to the bidirectional thrust ball bearing, thereby exempting the thrust load exerted on the screw 2, ensuring the strength of the screw 2, and avoiding the failure of the screw 2 resulting from looseness during the transmission thereof.

Further, referring to FIGS. 1-2, as a specific embodiment of the camera extending and retracting device provided by the present application, a guide rod 6 is further arranged between the first mounting plate 12 and the second mounting plate 13, the guide rod 6 is in parallel with the screw 2, and the guide rod 6 is configured to guide the nut 3 to move on the screw 2. The guide rod 6 is a bare rod, both the first mounting plate 12 and the second mounting plate 13 define mounting holes thereon for mounting the guide rod 6, the nut 3 defines thereon a first threaded hole 31 and a guide hole 32, the nut 3 is sleeved onto the threaded section 22 of the screw 2 via the first threaded hole 31 and moves on the threaded section 22 along with the rotation of the screw 2; the nut 3 is also sleeved onto the guide rod 6 via the guide hole 32, and a periphery of the nut 3 is embedded in the push block 4.

Further, referring to FIGS. 1-2, as a specific embodiment of the camera extending and retracting device provided by the present application, the drive unit comprises an electric motor 7 and a reducer 8. The electric motor 7 is configured to be in electric connection with a control circuit of the mobile phone, and the reducer 8 is in transmission connection between the electric motor 7 and the screw 2. In the camera extending and retracting device in this embodiment of the present application, the electric motor is controlled to rotate by the control circuit of the mobile phone, then the rotational speed of the electric motor is reduced by the reducer 8, such that the screw 2 is driven to rotate, the nut 3 is driven by the screw 2 to move forward and backward, which further drives the push block 4 to thrust the camera module to perform the extending and retracting movement, the extending and retracting movement of the camera module can be controlled by the forward and reverse rotation.

Preferably, referring to FIG. 2, as a specific embodiment of the camera extending and retracting device provided by the present application, the reducer 8 is preferably a planetary reducer 8. The principle of the planetary reducer 8 is based on a dynamic transmission mechanism, which adopts speed conversion of gears to reduce the number of the revolutions of the electric motor to a desired number of revolutions, and yield a relatively large torque. The gear wheel having a small number of teeth on the transmission shaft of the planetary reducer 8 mesh with a large gear wheel on an output shaft to achieve the purpose of speed reduction. Based on the design of the planetary reducer 8 of this embodiment of the present application, a relatively large transmission ratio in a relatively small thickness is realized, thereby further achieving the relatively large thrust force and improving the transmission efficiency.

Further, referring to FIG. 2, as a specific embodiment of the camera extending and retracting device provided by the present application, an outer casing of the reducer 8 is provided thereon with a male thread 81, the first mounting plate 12 is provided thereon on with a second threaded hole 120, and the reducer 8 is in threaded connection with the second threaded hole 120.

The present application further provides a mobile phone, comprising: a housing, a camera module, a display screen, and the camera extending and retracting device. The camera module is arranged in the housing, the display screen is arranged on the housing, and the camera extending and retracting device is in operative connection with the camera module and is configured to drive the camera module to extend out of the display screen and to retract to a back side of the display screen. In the mobile phone of the present application, by adopting the camera extending and retracting device as described above, the camera module of the mobile phone can be installed on the back side of the display screen, thereby improving the display proportion of the mobile phone.

The above description is only preferred embodiments of the present application, and is not intended to limit the application, and any modifications, equivalent substitutions, and improvements made within the spirit and principles of the present application are included within the scope of protection of the application.

What is claimed is:

1. A camera extending and retracting device, comprising:
   a support base configured to be mountable inside a housing of a mobile phone, and comprising:
      a base plate configured to be mounted inside the housing, and
      a first mounting plate and a second mounting plate;
   a screw movably arranged on the support base;
   a drive unit in connection with one end of the screw;
   a nut arranged on the screw; and
   a push block mounted onto the nut and configured to connect with the camera module of the mobile phone;
   wherein the other end of the screw is provided with a load bearing mechanism configured to bear an axial force of the screw, and the load bearing mechanism is mounted to the support base,
   wherein one end of the screw passes through the first mounting plate and is in connection with the drive unit, and the other end of the screw is arranged at the second mounting plate via the load bearing mechanism,
   wherein the load bearing mechanism comprises:
      two seat rings,
      a bearing washer arranged between the two seat rings,
      two holders, each of the two holders arranged between each of the two seat rings and the bearing washer, and
      balls embedded in the two holders;
   the other end of the screw is provided with a bare axel section, and the bearing washer, the two seat rings, and the two holders are all sleeved onto the bare axel section; and
   an outer periphery of the bearing washer fixed on the second mounting plate, and the two seat rings respectively axially stopped at two ends of the bare axel section,
   wherein the second mounting plate defines a two-stage stepped hole therein; and the bearing washer is held in a relatively large hole in the two-stage stepped hole and is stopped by a step of the two-stage stepped hole.

2. A camera extending and retracting device, comprising:
   a support base configured to be mountable inside a housing of a mobile phone, and comprising:
      a base plate configured to be mounted inside the housing, and
      a first mounting plate and a second mounting plate;
   a screw movably arranged on the support base;
   a drive unit in connection with one end of the screw;
   a nut arranged on the screw; and
   a push block mounted onto the nut and configured to connect with the camera module of the mobile phone;
   wherein the other end of the screw is provided with a load bearing mechanism configured to bear an axial force of the screw, and the load bearing mechanism is mounted to the support base,
   wherein one end of the screw passes through the first mounting plate and is in connection with the drive unit, and the other end of the screw is arranged at the second mounting plate via the load bearing mechanism, and
   wherein the load bearing mechanism comprises:
      two seat rings,
      a bearing washer arranged between the two seat rings,
      two holders, each of the two holders arranged between each of the two seat rings and the bearing washer, and
      balls embedded in the two holders;
   the other end of the screw is provided with a bare axel section, and the bearing washer, the two seat rings, and the two holders are all sleeved onto the bare axel section; and
   an outer periphery of the bearing washer fixed on the second mounting plate, and the two seat rings respectively axially stopped at two ends of the bare axel section, and wherein each said holder defines ball accommodating grooves therein; balls are accommodated in the ball accommodating grooves and extend out of two opposite sides of each said holder, wherein both of the bearing washer and the seat rings define countersunk grooves therein at positions corresponding to the balls to accommodate extending portions of the balls.

3. The camera extending and retracting device of claim 1, wherein the load bearing mechanism is a bidirectional thrust ball bearing.

4. The camera extending and retracting device of claim 1, wherein a guide rod is further arranged between the first mounting plate and the second mounting plate, wherein the guide rod is in parallel with the screw and is configured to guide the nut to move.

5. The camera extending and retracting device of claim 1, wherein the drive unit comprises: an electric motor configured to be in electric connection with a control circuit of the mobile phone, and a reducer in transmission connection between the electric motor and the screw.

6. The camera extending and retracting device of claim 5, wherein the reducer is a planetary reducer.

7. A mobile phone, comprising: a housing, a camera module arranged in the housing, and a display screen arranged onto the housing, wherein the mobile phone further comprises the camera extending and retracting device of claim 1, the camera extending and retracting device is in operative connection with the camera module and is configured to drive the camera module to extend out of the display screen and to retract to a back side of the display screen.

8. The camera extending and retracting device of claim 2, wherein the load bearing mechanism is a bidirectional thrust ball bearing.

9. The camera extending and retracting device of claim 2, wherein a guide rod is further arranged between the first mounting plate and the second mounting plate, wherein the guide rod is in parallel with the screw and is configured to guide the nut to move.

10. The camera extending and retracting device of claim 2, wherein the drive unit comprises: an electric motor configured to be in electric connection with a control circuit of the mobile phone, and a reducer in transmission connection between the electric motor and the screw.

11. The camera extending and retracting device of claim 10, wherein the reducer is a planetary reducer.

12. A mobile phone, comprising: a housing, a camera module arranged in the housing, and a display screen arranged onto the housing, wherein the mobile phone further comprises the camera extending and retracting device of claim 5, the camera extending and retracting device is in operative connection with the camera module and is configured to drive the camera module to extend out of the display screen and to retract to a back side of the display screen.

* * * * *